United States Patent
Chen et al.

(10) Patent No.: US 9,739,865 B2
(45) Date of Patent: Aug. 22, 2017

(54) IDENTIFICATION METHOD AND IDENTIFICATION SYSTEM FOR AN OBJECT'S PASSING ROUTE DIRECTION

(71) Applicant: Beijing Launch Technology Development Co. Ltd., Beijing (CN)

(72) Inventors: Hao Chen, Beijing (CN); Jian Wu, Beijing (CN); Jianqiang Zeng, Beijing (CN)

(73) Assignee: BEIJING LAUNCH TECHNOLOGY DEVELOPMENT CO. LTD., Beijing (CN)

( * ) Notice: Subject to any disclaimer, the term of this patent is extended or adjusted under 35 U.S.C. 154(b) by 253 days.

(21) Appl. No.: 14/809,368

(22) Filed: Jul. 27, 2015

(65) Prior Publication Data

US 2016/0061927 A1 Mar. 3, 2016

(30) Foreign Application Priority Data

Aug. 29, 2014 (CN) .......................... 2014 1 0438104

(51) Int. Cl.
  *G01S 3/12* (2006.01)
  *G01S 1/08* (2006.01)
  *G01S 3/14* (2006.01)
  *G07C 9/00* (2006.01)

(52) U.S. Cl.
  CPC ................. *G01S 3/12* (2013.01); *G01S 1/08* (2013.01); *G01S 3/143* (2013.01); *G07C 9/00* (2013.01)

(58) Field of Classification Search
  CPC ..... G01S 1/00; G01S 1/02; G01S 1/04; G01S 1/08; G01S 1/10; G01S 1/14; G01S 3/00; G01S 3/02; G01S 3/12; G01S 3/14; G01S 3/143; G01S 3/146; G07C 9/00; G07C 9/00007; G07C 9/00015; G07C 9/00111; G07C 9/00134
  See application file for complete search history.

(56) References Cited

U.S. PATENT DOCUMENTS

| | | | |
|---|---|---|---|
| 7,538,666 B2 * | 5/2009 | Campman ........... | G07C 9/00111 340/539.13 |
| 2010/0211794 A1 * | 8/2010 | Bilobrov ............ | G06K 9/00067 713/176 |
| 2016/0254889 A1 * | 9/2016 | Shattil ................... | H04L 5/0035 370/329 |

* cited by examiner

*Primary Examiner* — Van Trieu
(74) *Attorney, Agent, or Firm* — Enshan Hong; VLP Law Group LLP

(57) ABSTRACT

An identification method comprising: when an object is in a whole process from entering to separating from a region inducted by the low-frequency electromagnetic field, receiving the low-frequency signal of the low-frequency electromagnetic field in real time; extracting the attribute code and signal intensity corresponding to the low-frequency signal received and conducting associate storage; and after the object separates from the region inducted by the low-frequency electromagnetic field, determining the route direction along which the object passes through the vector beacons according to the attribute code and signal intensity stored.

8 Claims, 7 Drawing Sheets

IDENTIFICATION METHOD AND IDENTIFICATION SYSTEM FOR AN OBJECT'S PASSING ROUTE DIRECTION

BACKGROUND OF THE INVENTION

1. Field of the Invention

The present invention relates to the field of route identification, and more particularly, to an identification method and an identification system for an object's passing route direction.

2. Description of the Related Art

Present systems for identifying passing in and out situations of personnel and objects mainly include: a system designed by a tag array, a system designed by a pair of directional antennas, a system designed by double coils, and the like. These systems are mainly applied to a channel type large space environment.

However, all the foregoing systems for identifying passing in and out situations of personnel and objects have certain defects. For example, these systems have big limitations on the installation environments, cannot be effectively applied to such a smaller space environment as a most common door with a standard size, and have the defects of small application range, poor environmental adaptability, presence of blind identification zone, easily make incorrect identification and low practicability, or the like.

SUMMARY OF THE INVENTION

A technical problem to be solved by the present invention is to provide an identification method and an identification system for an object's passing route direction, which solves the problems of the existing system for identifying the passing in and out situations of personnel in the prior art such as installation limitation, poor applicability to a small space, poor environmental adaptability, blind identification zone, low practicability, or the like. Effective and reliable passing route direction identification of common doors with a standard size (house door, building door, office door and the like) is realized.

In order to solve the foregoing technical problem, embodiments of the present invention provide an identification method for an object's passing route direction, which is applied to a system including at least one group of vector beacons placed at preset intervals, wherein each group includes two vector beacons, and each group of vector beacons alternatively send two low-frequency signals carrying different attribute codes according to a preset sequence, the two low-frequency signals form two low-frequency electromagnetic fields which are partially overlapped in space, and the preset interval enables the area of the overlapped part of the two low-frequency electromagnetic field to be no less than 70% of the total area of the electromagnetic fields or the maximum extension width of the independence part to be less than 1 m, and the identification method includes:

when an object is in a whole process from entering to separating from a region inducted by the low-frequency electromagnetic field, receiving the low-frequency signal of the low-frequency electromagnetic field in real time;

extracting the attribute code and a signal intensity corresponding to the low-frequency signal received and conducting associate storage; and after the object separates from the region inducted by the low-frequency electromagnetic field, judging the route direction along which the object passes through the vector beacons according to the attribute code and signal intensity stored.

Wherein, the identification method further includes:

transmitting the route direction along which the object passes through the vector beacons and identification information representing the identity of the object to a superior system.

Wherein, the identification method further includes:

when the step of transmitting the route direction along which the object passes through the vector beacons and the identification information representing the identity of the object to the superior system is failed, retransmitting the route direction and the identification information.

Wherein, the step of judging the route direction along which the object passes through the vector beacons according to the attribute code and signal intensity stored after the object separates from the region inducted by the low-frequency electromagnetic field includes:

after the object separates from the region inducted by the low-frequency electromagnetic field, sequencing the different attribute codes stored according to a storage sequence, and respectively selecting a preset number of attribute codes as a first segment and a final segment in sequence from the first attribute code and the last attribute code; and respectively comparing signal intensity statistics values of different attribute codes in the first segment and the final segment according to the signal intensity corresponding to the attribute codes, and respectively judging the first approached vector beacon when the object enters the region inducted by the low-frequency electromagnetic field and the last separated vector beacon when the object separates from the region inducted by the low-frequency electromagnetic field according to the comparison result.

In order to solve the foregoing technical problem, embodiments of the present invention further provide an identification system for object's passing route direction, wherein the system includes at least one group of vector beacons placed at preset intervals, wherein each group includes two vector beacons, and each group of vector beacons alternatively send two low-frequency signals carrying different attribute codes according to a preset sequence, the two low-frequency signals form two low-frequency electromagnetic fields which are partially overlapped in space, and the preset interval enables the area of the overlapped part of the two low-frequency electromagnetic field to be no less than 70% of the total area of the electromagnetic fields or the maximum extension width of the independence part to be less than 1 m, and the identification system further includes:

a receiving module configured to, when an object is in a whole process from entering to separating from a region inducted by the low-frequency electromagnetic field, receive the low-frequency signal of the low-frequency electromagnetic field in real time;

an extraction module configured to extract the attribute code and a signal intensity corresponding to the low-frequency signal received and conduct associate storage; and a judgment module configured to, after the object separates from the region inducted by the low-frequency electromagnetic field, judge the route direction along which the object passes through the vector beacons according to the attribute code and signal intensity stored.

Wherein, the identification system further includes:

a transmission module configured to transmit the route direction along which the object passes through the vector beacons and identification information representing the identity of the object to a superior system.

Wherein, the identification system further includes:

a retransmission module configured to, when the step of transmitting the route direction along which the object passes through the vector beacons and the identification information representing the identity of the object to the superior system is failed, retransmit the route direction and the identification information.

Wherein, the judgment module includes:

a selection module configured to, after the object separates from the region inducted by the low-frequency electromagnetic field, sequence the different attribute codes stored according to a storage sequence, and respectively select a preset number of attribute codes as a first segment and a final segment in sequence from the first attribute code and the last attribute code; and a judgment submodule configured to respectively compare signal intensity statistics values of different attribute codes in the first segment and the final segment according to the signal intensity corresponding to the attribute codes, and respectively judge the first approached vector beacon when the object enters the region inducted by the low-frequency electromagnetic field and the last separated vector beacon when the object separates from the region inducted by the low-frequency electromagnetic field according to the comparison result.

The foregoing technical solution of the present invention has the advantageous effects as follows:

the identification method for an object's passing route direction according to embodiments of the present invention is applied to the system that includes at least one group of vector beacons placed at preset intervals, wherein each group includes two vector beacons, and each group of vector beacons alternatively send two low-frequency signals carrying different attribute codes according to a preset sequence, the two low-frequency signals form two low-frequency electromagnetic fields which are partially overlapped in space, and a preset interval enables the area of the overlapped part of the two low-frequency electromagnetic field to be no less than 70% of the total area of the electromagnetic fields or the maximum extension width of the independence part to be less than 1 m. Wherein, the preset interval may be a very small interval, for example, the thickness of a common doorframe. At this moment, the low-frequency electromagnetic fields of two vector beacons in one group are approximately overlapped in space.

According to the identification method, the low-frequency signal of the low-frequency electromagnetic field is received in real time when the object is in a whole process from entering to separating from the approximately overlapped region inducted by the low-frequency electromagnetic field, and the attribute code and the signal intensity corresponding to the low-frequency signal received are extracted and associate storage is conducted; and after the object separates from the region inducted by the low-frequency electromagnetic field, the route direction along which the object passes through the vector beacons is judged according to the attribute code and signal intensity stored. The identification method realizes the effective monitoring on the passing in and out situations of personnel or objects in a non-large space, improves the adaptability to a complicated environment, and solves the problem in the prior art that the double coil solution can only work in a sufficiently large and independent electromagnetic field region and cannot realize route identification in a smaller space. Moreover, the low-frequency electromagnetic fields produced by the vector beacons have strong consistency, can effectively cover the monitoring area, avoid a blind identification zone, and has high identification efficiency.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

The vector beacon referred to in this application is used to transmit low-frequency encoded signals and to form low-frequency electromagnetic field around a beacon, which can be received by an identification unit. Beacon is usually used in pairs, with one pair in each group. If needed, multiple groups of beacons can be used.

The low-frequency signal referred to in this application may have a frequency within the range of 85K-150 KHz.

In the prior art, since the areas of independent parts of two low-frequency electromagnetic fields of coils need to be as big as possible so as to ensure the effective identification of a separation code, a system for identifying the passing in and out situations of personnel via double coils has many limitations on the installation environment, and cannot be effectively implemented in a narrow or complicated space environment.

Moreover, if the electromagnetic fields produced by the coils are expected to cover a common door with a width of 0.8 m and a height of 2 m, the area encircled needs to at least reach 1 m, and the center to center interval needs to reach 1.5 m above, and the coils can only be distributed on a ground surface and are not suitable for in-building installation. However, when placing the coils on the ground surface, in order to achieve effective coverage height and width, the area encircled by the coils and a drive power will be increased, which causes oversize radiating area on the horizontal direction, and has low practicability. Moreover, the low-frequency electromagnetic fields are extremely sensitive to metals, particularly to a reinforcing steel structure woven into a mesh. When placing the coils on the ground surface, the actual direction will be extremely influenced in case of encountering reinforcing steels in the building, thus causing route identification errors.

In addition, when two doors or channels are closer, the system cannot be effectively implemented.

An identification method for object pass route according to embodiments of the present invention does not need manual intervention, can accurately identify a route direction along which an object passes through vector beacons, and particularly realizes the effective monitoring on the passing in and out situations of personnel or objects in a non-large space. Through building approximately overlapped low-frequency electromagnetic fields, reliable route direction identification is realized, the adaptability to a complicated environment is improved, and the problem in the prior art that the double coil solution can only work in a sufficiently large and independent electromagnetic field region and cannot realize route identification in a smaller space is solved. Moreover, the electromagnetic fields produced by the vector beacons can effectively cover the moisture area, avoid a blind identification zone, and has high identification efficiency.

Figure 1:
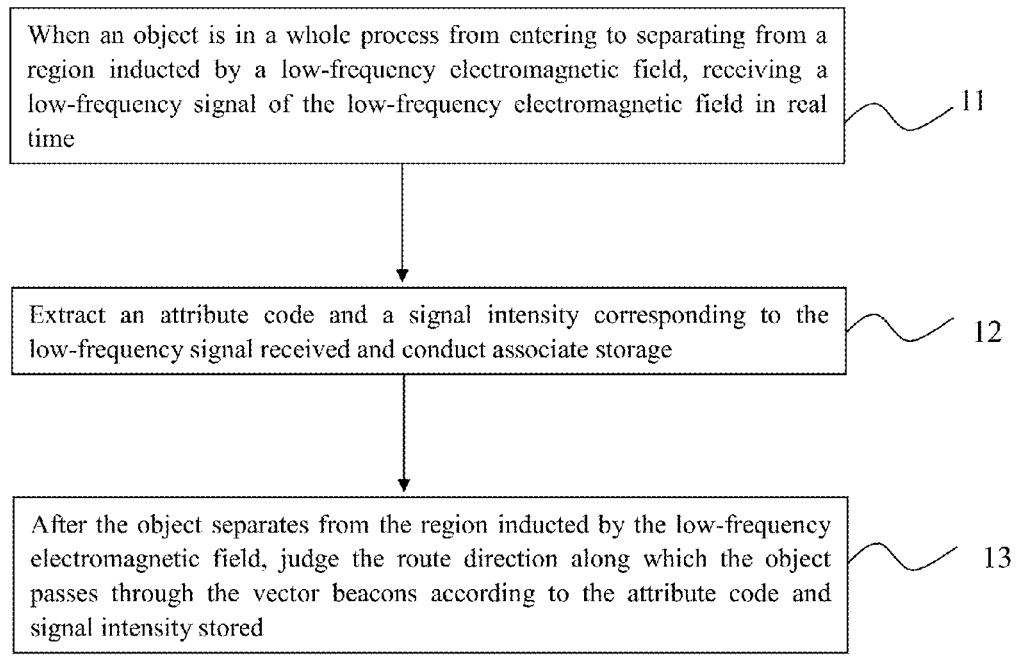
FIG. 1 is a flow chart of an identification method for an object's passing route direction according to the present invention.

As shown in FIG. 1, the identification method for an object's passing route direction according to embodiments of the present invention is applied to a system that includes at least one group of vector beacons placed at preset intervals, wherein each group comprises two vector beacons, and each group of vector beacons alternatively send two low-frequency signals carrying different attribute codes according to a preset sequence, the two low-frequency signals form two low-frequency electromagnetic fields which are partially overlapped in space, and the preset interval enables the area of the overlapped part of the two low-frequency electromagnetic field to be no less than 70% of the total area of the electromagnetic fields or the maximum extension width of the independence part to be less than 1 m, and the identification method includes:

in step 11, when the object is in a whole process from entering to separating from a region inducted by the low-frequency electromagnetic field, the low-frequency signal of the low-frequency electromagnetic field is received in real time;

in step 12, the attribute code and a signal intensity corresponding to the low-frequency signal received are extracted and associate storage is conducted; and in step 13, after the object separates from the region inducted by the low-frequency electromagnetic field, a route direction along which the object passes through the vector beacons is judged according to the attribute code and signal intensity stored.

In the identification method for an object's passing route direction according to the embodiments of the present invention, the preset interval for one group of vector beacons may be a very small interval, for example, the thickness of a common doorframe. At this moment, the low-frequency electromagnetic fields of two vector beacons in one group are approximately overlapped in space. The low-frequency signal of the low-frequency electromagnetic field is received in real time when the object enters the process of separating from the approximately overlapped region inducted by the low-frequency electromagnetic field, and the attribute code and the signal intensity corresponding to the low-frequency signal received are extracted and associate storage is conducted; and after the object separates from the region inducted by the low-frequency electromagnetic field, the route direction along which the object passes through the vector beacons is judged according to the attribute code and signal intensity stored. The effective monitoring on the passing in and out situations of personnel or objects in a non-large space is realized, and the adaptability to a complicated environment is improved. The electromagnetic fields produced by the vector beacons have strong consistency, can effectively cover the monitoring area, avoid a dead identification zone, and has high identification efficiency, strong environmental adaptability and wide application range.

Figure 5:
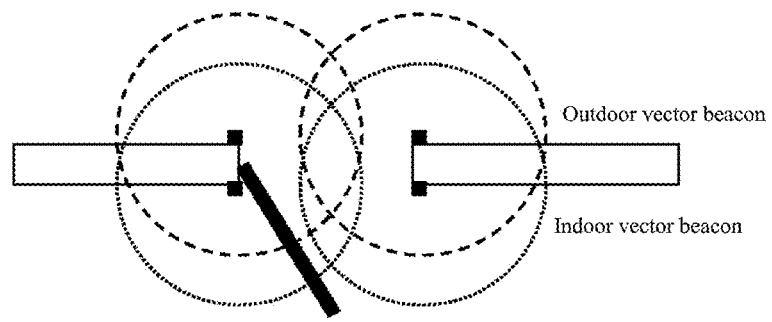
FIG. 5 is a second installation schematic view of vector beacons of the identification system for an object's passing route direction according to the present invention.
Figure 7:
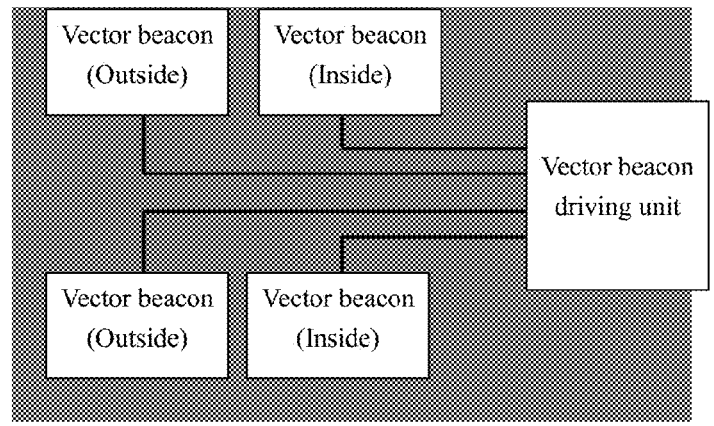
FIG. 7 is a first structure schematic view of vector beacons of the identification system for an object's passing route direction according to the present invention.

In a specific embodiment of the present invention, the vector beacon can be connected to a power driving circuit, by which the vector beacons are driven to work. To be specific, and as shown in FIG. 5 and FIG. 7, when the vector beacons are multiple groups of vector beacons in a uni-path, the multiple groups of vector beacons can be connected to one power driving circuit (i.e., a vector beacon driving unit), and the power driving circuit drives the multiple groups of vector beacons to alternatively produce low-frequency signals according to a preset sequence. At this moment, the vector beacons work alternatively, thus avoiding mutual interference and ensuring smooth conducting of route identification.

Figure 6:
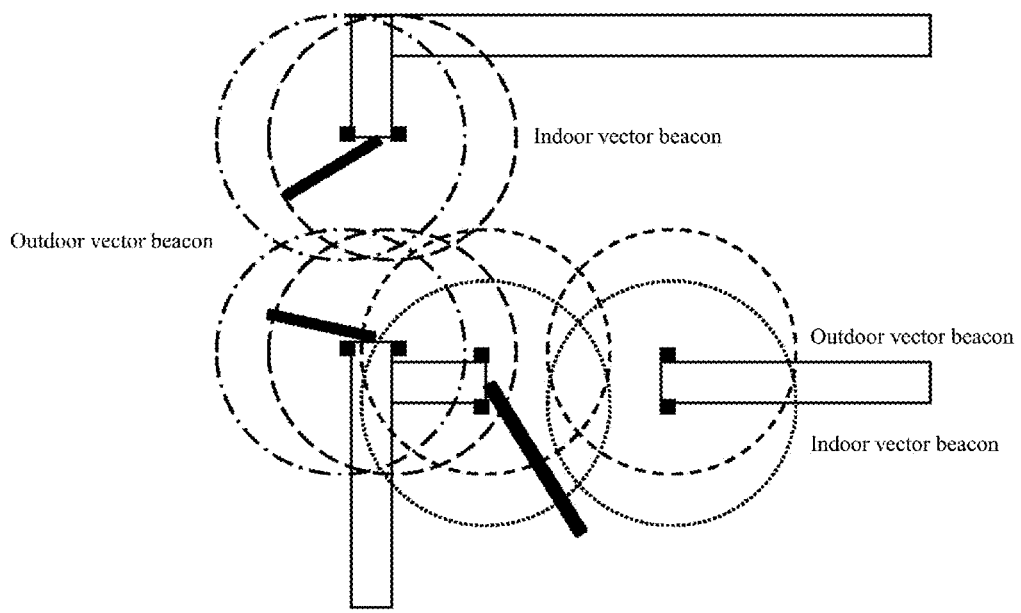
FIG. 6 is a third installation schematic view of vector beacons of the identification system for an object's passing route direction according to the present invention.
Figure 8:
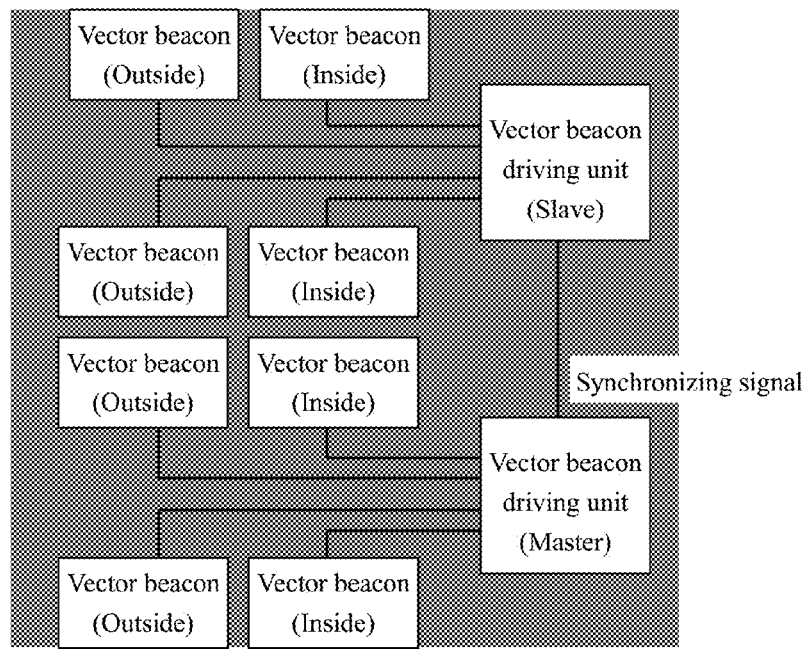
FIG. 8 is a second structure schematic view of vector beacons of the identification system for an object's passing route direction according to the present invention.

Wherein, as shown in FIG. 6 and FIG. 8, when the vector beacons are multiple groups of vector beacons in multi-paths, the vector beacons work alternatively according to a second preset sequence. To be specific, the vector beacons in each path can be respectively connected to a power driving circuit, and a synchronizing signal emitted by the power driving circuit of one path and shared by the power driving circuits of other paths is increased. At this moment, the vector beacons in each path work alternatively, and will not interfere with each other, thus further ensuring smooth conducting of route identification.

Preferably, signals radiated by the vector beacons are all from the same low-frequency signal source and have homology, wherein only modulation attribute codes are different. Standard integrated circuits are employed as the power driving circuits of the vector beacons, so that the vector beacons have strong consistency. Moreover, power is uniformly supplied by the driving circuits; therefore, the signal intensity of the electromagnetic field produced is highly consistent. The above ensures that the electromagnetic fields produced by the vector beacons have strong consistency in space, and changes of the signal intensity truly reflect changes of movement distance of the object, and the accuracy of identifying the object pass route direction according to the signal intensity is ensured.

Wherein, the identification method for object's passing route direction according to the embodiments of the present invention may further include:

in step 14, the route direction along which the object passes through the vector beacons and identification information representing the identity of the object are transmitted to a superior system.

At this moment, through transmitting the route direction along which the object passes through the vector beacons and identification information representing the identity of the object to the superior system for use, the effective monitoring on the passing in and out situations of the object is realized, system management is facilitated, and the practicability is increased.

Wherein, the information can be transmitted to the superior system through a wireless manner, the route information along which the object passes through and the identification information representing the identity of the object being carried in the information. Moreover, the central frequency point of the wireless communication frequency can be such high frequency wave bands as 433 MHz, 915 MHz, 2.4 GHz or 5.8 GHz and the like, so that the communication rate is high and the channel capacity is big.

Further, the identification method for an object's passing route direction according to the embodiments of the present invention may further include:

in step 15, when the step of transmitting the route direction along which the object passes through the vector beacons and the identification information representing the identity of the object to the superior system is failed, the route direction and the identification information are retransmitted.

At this moment, the communication reliability with the superior system is ensured through detecting whether the information is successfully uploaded to the system and retransmitting the information in case that the uploading is failed.

In a specific embodiment of the present invention, the above step 13 may include:

in step 131, after the object separates from the region inducted by the low-frequency electromagnetic field, the different attribute codes stored are sequenced according to a storage sequence, and a preset number of attribute codes are respectively selected as a first segment and a final segment in sequence from the first attribute code and the last attribute code; and in step 132, signal intensity statistics values of different attribute codes in the first segment and the final segment are respectively compared according to the signal intensity corresponding to the attribute codes, and the first approached vector beacon when the object enters the region inducted by the low-frequency electromagnetic field and the last separated vector beacon when the object separates from the region inducted by the low-frequency electromagnetic field are respectively judged according to the comparison result.

At this moment, through acquiring the attribute codes in the first segment and the final segment arranged according to a storage sequence, and then respectively comparing the signal intensity statistics values of different attribute codes in the first segment and the final segment in step 131 and step 132, the route direction along which the object passes through the vector beacons can be accurately judged and transmitted to the superior system for use, thus monitoring the passing in and out situations of the personnel or object.

Moreover, in case that the vector beacons are separately disposed in multi-paths, calculation can be conducted according to the foregoing steps for different paths, so as to ensure calculation accuracy and realize effective identification under a complicated environment.

The specific embodiment of the present invention will be illustrated as follows.

Figure 2:
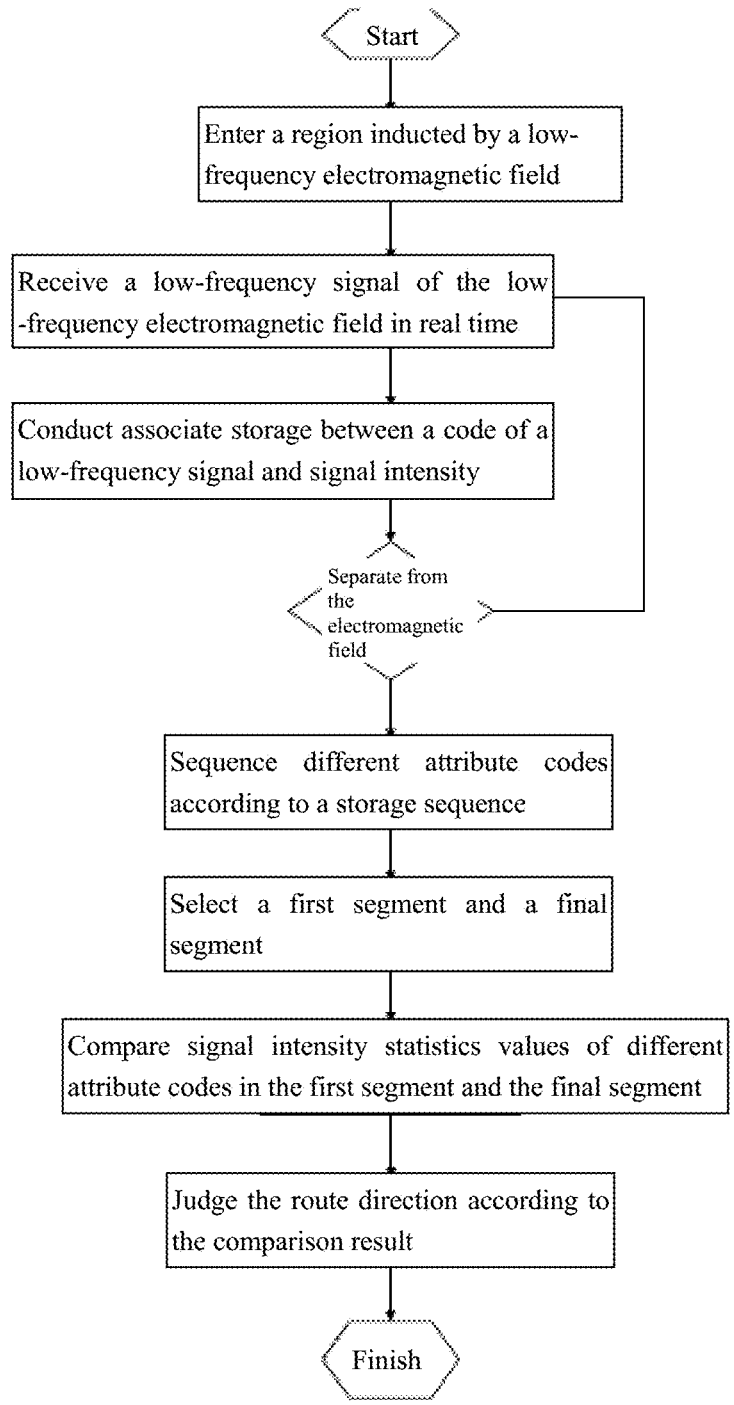
FIG. 2 is a flow chart of one embodiment of the identification method for an object's passing route direction according to the present invention.

As shown in FIG. 2, it is assumed that one group of object pass environment is configured, which includes two vector beacons, and attribute codes corresponding to the two vector beacon M1 and M2 are respectively B1 and B2. when an object is in a whole process from entering to separating from a region inducted by the low-frequency electromagnetic field, the low-frequency signal of the low-frequency electromagnetic field is received in real time; then the attribute code and signal intensity corresponding to the low-frequency signal received are extracted and associate storage is conducted; and after the object separates from the region inducted by the low-frequency electromagnetic field, the different attribute codes stored are sequenced according to a storage sequence, which is assumed as: B1、B1, B2, B1, B2、B1, B2, . . . B1、B2、B2、B1; and a preset number (assumed to be 20) of attribute codes are respectively selected as a first segment and a final segment in sequence from the first attribute code and the last attribute code; and the signal intensity statistics values of B1 and B2 in the first segment and the final segment are respectively compared according to the signal intensity corresponding to the attribute code, and the first approached vector beacon when the object enters the region inducted by the low-frequency electromagnetic field and the last separated vector beacon when the object separates from the region inducted by the low-frequency electromagnetic field are respectively judged according to the comparison result. It is assumed that the comparison result is the signal intensity statistics value of B1 in the first segment is maximum, and the signal intensity statistics value of B2 in the final segment is maximum, then it may be judged that the vector beacon M1 corresponding to B1 is the vector beacon firstly approached by the object, and the vector beacon M2 corresponding to B2 is the vector beacon last separated by the object.

When multi-path identification is needed, the route direction along which the object passes through the vector beacons under each path can be judged according to the foregoing method as well.

The identification method for object pass route according to the embodiments of the present invention can accurately identify the route direction along which the object passes through vector beacons, particularly realizes the effective monitoring on the passing in and out situations of personnel or objects in a non-large space, and improves adaptability to a complicated environment. Moreover, the electromagnetic fields produced by the vector beacons have strong consistency, can effectively cover the monitoring area, avoid a dead identification zone, and have high identification efficiency, strong environmental adaptability and wide application range.

Figure 3:
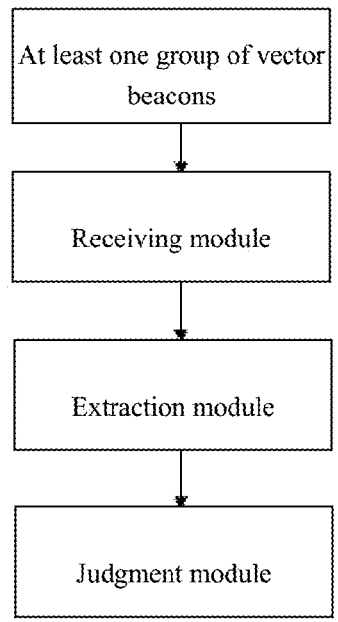
FIG. 3 is a structure schematic view of an identification system for an object's passing route direction according to the present invention.

As shown in FIG. 3, embodiments of the present invention further provide an identification system for object's passing route direction, which includes at least one group of vector beacons placed at preset intervals, wherein each group includes two vector beacons, and each group of vector beacons alternatively send two low-frequency signals carrying different attribute codes according to a preset sequence, the two low-frequency signals form two low-frequency electromagnetic fields which are partially overlapped in space, and the preset interval enables the area of the overlapped part of the two low-frequency electromagnetic field to be no less than 70% of the total area of the electromagnetic fields or the maximum extension width of the independence part to be less than 1 m, and the identification system further includes:

a receiving module configured to, when the object is in a whole process during from entering to separating from a region inducted by the low-frequency electromagnetic field, receiving the low-frequency signal of the low-frequency electromagnetic field in real time;

an extraction module configured to, extract the attribute code and signal intensity corresponding to the low-frequency signal received and conduct associate storage; and a judgment module configured to, after the object separates from the region inducted by the low-frequency electromagnetic field, judge the route direction along which the object passes through the vector beacons according to the attribute code and signal intensity stored.

In the identification system for object's passing route direction according to the embodiments of the present invention, the preset interval for one group of vector beacons may be a very small interval, for example, the thickness of a common doorframe. At this moment, the low-frequency electromagnetic fields of two vector beacons in one group are approximately overlapped in space. The effective monitoring on the passing in and out situations of personnel or objects in a non-large space is realized, and the adaptability to a complicated environment is improved. Moreover, the electromagnetic fields produced by the vector beacons have strong consistency, can effectively cover the monitoring area, avoid dead identification zones, and has high identification efficiency. Moreover, the vector beacons have small volumes, and are convenient to install, so that the practicability is increased.

In the identification system according to the embodiments of the present invention, the vector beacons can be installed closely to form approximately overlapped low-frequency electromagnetic fields, and route identification can be realized through changes of the signal intensity. However, according to the double coil solution in the prior art, a relatively further distance shall be kept to ensure that an independent electromagnetic field region is sufficiently spacious, and the route direction is identified using a region code that can be uniquely received.

For example, one group of vector beacons according to the embodiments of the present invention are respectively installed inside and outside a standard door (80 cm×2000 cm); reliable identification can be realized when the interval between the vector beacons is only equal to a thickness of a standard wall (15-25 cm); moreover, there is no dead zone (loophole) in any position within a doorframe. However, identification is possibly realized only when the two coils of the prior art keep a center to center distance above 1000-1500 cm; the area or driving power of the coils needs to be enlarged to further increase the interval so as to further ensure that there is no dead zone (loophole) within a height of 2000 cm. The area of the coil ranges from 0.8 to 2 m. Due to large area, big interval and huge redundant irradiation space, the coils are very difficult to have practicability in a non-large space environment, and cannot realize effective identification.

The identification system according to the embodiments of the present invention realizes effective monitoring on the passing in and out situations of personnel or objects in a non-large space, and improves adaptability to a complicated environment.

Wherein, the identification system for the object's passing route direction according to the embodiments of the present invention may further include:

a transmission module configured to transmit the route direction along which the object passes through the vector beacons and identification information representing the identity of the object to a superior system.

At this moment, through transmitting the route direction along which the object passes through the vector beacons and identification information representing the identity of the object to the superior system for use, the effective monitoring on the passing in and out situations of the object is realized, system management is facilitated, and the practicability is increased.

To be specific, the receiving module can be a low-frequency antenna, the extraction module can be a low-frequency wake-up receiver, the judgment module can be a microprocessor MCU, and the transmission module can be a radio frequency transceiver.

Preferably, the receiving module is a 3D low-frequency antenna, and the low-frequency wake-up receiver is an AS3933 chip. At this moment, the low-frequency antenna can preferably receive a low-frequency signal having the optimal quality in the three dimension directions to ensure uniformity of induction changes of low-frequency electromagnetic fields, avoid influences caused by the low-frequency electromagnetic fields due to mutations produced on directions, and further ensure accuracy of judging the object's passing direction route according to the signal intensity.

Further, the MCU and the radio frequency transceiver can be integrated into a processor module, which can be Ti CC430F5137 (a microprocessor with an RF Transceiver). The processor module, the foregoing low-frequency antenna and the AS3933 can be integrated into an intelligent recognition unit. During application, an object carrying the intelligent identification unit can be effectively identified through the route direction of the vector beacons. The hardware of the intelligent recognition unit may be composed of a receiving module, an extraction module, MCU, RF transceiver, and a battery. The receiver module may be a 3D low-frequency antenna. The extraction module may be AS3933.MCU and the transmission module may be Ti CC430F5137 (a microprocessor with a radio transceiver).

Wherein, in order to ensure the normal operation of the intelligent identification unit when being placed on a moving object, a cell can be installed in the intelligent identification unit to supply power for each module of the intelligent recognition unit, thus ensuring independent operation of the intelligent recognition unit.

Wherein, the superior system can be an information processing unit, and the identification system according to the embodiments of the present invention can further include the information processing unit. Moreover, both the information processing unit and the intelligent identification unit carry identification ID information. The information processing unit may comprise embedded MCU software and hardware where the hardware core part may comprise SANGSUNG S5PV210 processor and Ti CC1101 RF transceiver, and the software is used for hardware initialization, RF data receiving and transmitting, network communications, data processing, etc.

To be specific, the intelligent identification unit can transmit the judged route direction along which the object passes through the vector beacon and the self-contained ID information of the intelligent identification unit to the information processing unit. The information processing unit can transmit the route direction along which the object passes through the vector beacon, the ID information of the intelligent identification unit and the self-contained ID information of the information processing unit to the superior system of the information processing unit through a wired or wireless manner. At this moment, the ID information of the intelligent identification unit is namely the identification information that can represent the identity of the object.

Moreover, the intelligent identification unit can transmit the electric quantity information of the cell to the information processing unit, and reports the electric quantity information to the system through the information processing unit, and the system prompts when the electric quantity of the cell of the intelligent identification units not sufficient. Therefore, the cell of the intelligent identification unit is charged or replaced in a timely manner, so as to ensure normal working of the intelligent recognition unit, thus realizing intelligent maintenance and improving practicability.

Wherein, when a plurality of intelligent recognition units simultaneously transmit information to the information processing unit, the intelligent recognition units can be controlled through a preset anti-collision mechanism, so that the plurality of intelligent recognition units cannot interfere with each other, thus ensuring normal receiving of the information processing unit. Therefore, the receiving efficiency is effectively improved, and the normal operation of the system is ensured.

Wherein, the identification system for the object's passing route direction according to the embodiments of the present invention may further include:

a retransmission module configured to, when the step of transmitting the route direction along which the object passes through the vector beacons and the identification information representing the identity of the object to the superior system is failed, retransmit the route direction and the identification information.

At this moment, the communication reliability with the superior system is ensured through detecting whether the information is successfully uploaded to the system and retransmitting the information in case that the uploading is failed.

Wherein, the retransmission module can also be integrated into the intelligent recognition unit. To be specific, the information processing unit is also configured to, after receiving the information transmitted by the intelligent recognition unit, return confirmation information to the intelligent recognition unit. While the retransmission module is configured to, when not receiving the confirmation information sent by the information processing unit, control a transmission unit to retransmit.

Preferably, the intelligent identification unit works under a low power consumption standby mode before entering the region of the vector beacon inducted by the low-frequency electromagnetic field, works normally after entering the region inducted by the low-frequency electromagnetic field, and enters the low power consumption standby mode again when receiving the confirmation information returned by the information processing unit. At this moment, the effective identification of the object pass route direction is ensured on the basis of sufficiently saving resources.

Wherein, the superior system of the information processing unit can be a monitoring system which is configured to arrange and record the information sent by the information processing unit, and is also configured to display the judged route direction for the object to pass through the vector beacons according to a preset manner. The identification system for an object's passing route direction according to the embodiments of the present invention may further include the monitoring system. The monitoring system may be composed of a computer installed with a specific program. The computer may be an ordinary PC or server, which exchanges instructions and data with the information processing unit via network. The specific program is used for storing the entire system's configuration, displaying specific applications of data identification, communications among various units, and data storage.

Figure 4:
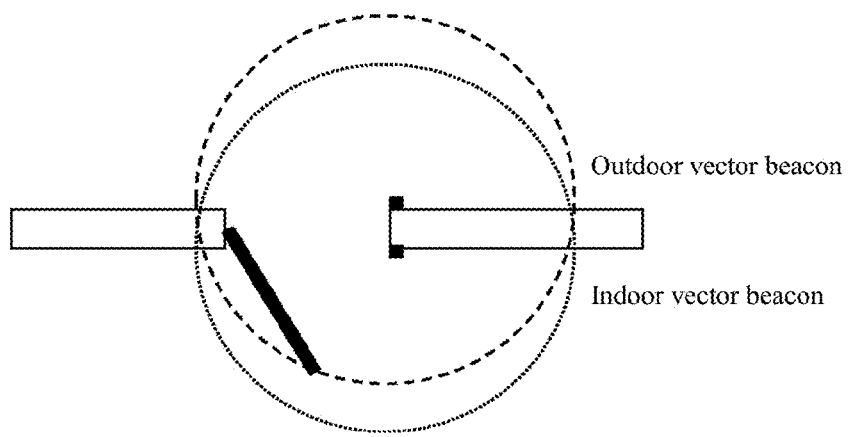
FIG. 4 is a first installation schematic view of vector beacons of the identification system for an object's passing route direction according to the present invention.
Figure 9:
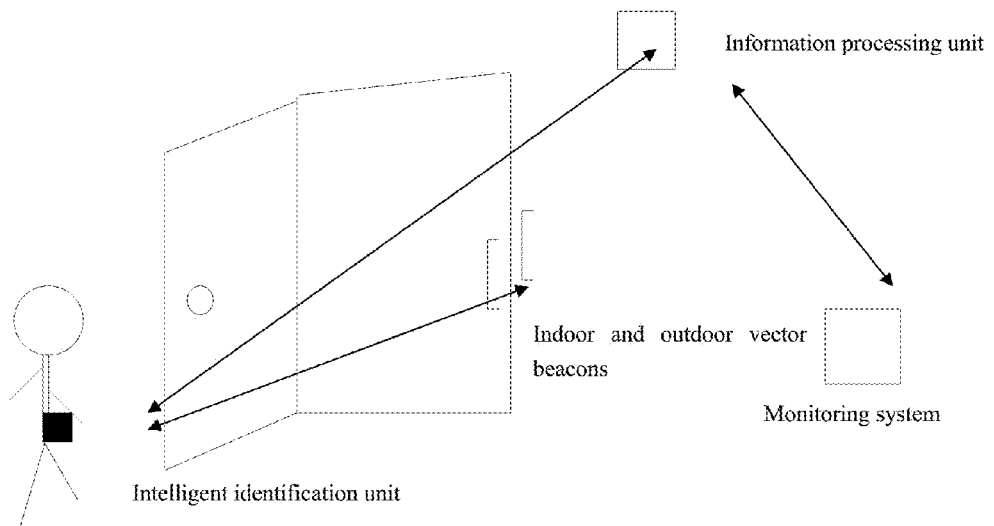
FIG. 9 is a first application schematic view of the identification system for an object's passing route direction according to the present invention.
Figure 10:
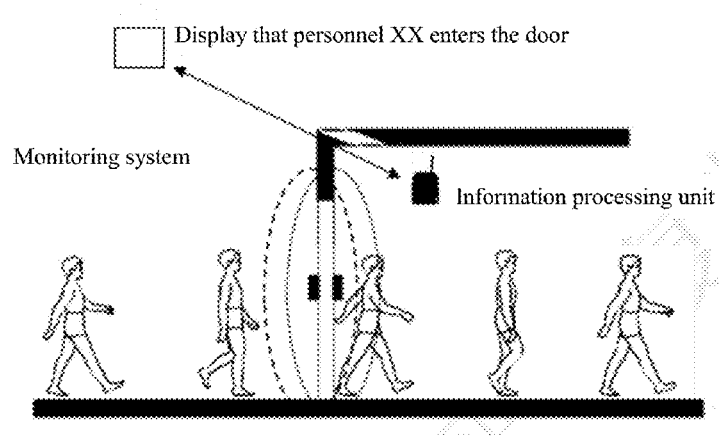
FIG. 10 is a second application schematic view of the identification system for an object's passing route direction according to the present invention.

In an embodiment, and as shown in FIG. 4, FIG. 9 and FIG. 10, the identification system according to the embodiments of the present invention includes a group of vector beacons (two) which are respectively installed inside and outside a doorframe. When personnel XX carrying the intelligent identification unit passes in and out from the door, the intelligent identification unit receives the low-frequency signal sent by the vector beacons in real time, and judges the route direction for the personnel XX to pass the door according to the change rules of the signal intensity of the low-frequency signal, and transmits the judged route direction, the ID information of the intelligent identification unit carried by the personnel XX and the electric quantity information of the cell to the information processing unit, wherein the information processing unit transmits the judged route direction, the ID information of the intelligent identification unit carried by the personnel XX and the electric quantity information of the cell to the monitoring system, and the monitoring system displays that the personnel XX passes in and out from the door.

In a specific embodiment of the present invention, the judgment module may include:

a selection module configured to, after the object separates from the region inducted by the low-frequency electromagnetic field, sequence the different attribute codes stored according to a storage sequence, and respectively select a preset number of attribute codes as a first segment and a final segment from the first attribute code and the last attribute code; and a judgment submodule configured to respectively compare signal intensity statistics values contained in different attribute codes of the first segment and the final segment according to the signal intensity corresponding to the attribute codes, and respectively judge the first approached vector beacon when the object enters the region inducted by the low-frequency electromagnetic field and the last separated vector beacon when the object separates from the region inducted by the low-frequency electromagnetic field according to the comparison result.

At this moment, through acquiring the attribute codes in the first segment and the final segment arranged according to a storage sequence, and then respectively comparing the signal intensity statistics values of different attribute codes in the first segment and the final segment via the selection module and the judgment submodule, the route direction along which the object passes through the vector beacons can be accurately judged and transmitted to the superior system for use, thus monitoring the passing in and out situations of the personnel or object.

In the identification system for the object's passing route direction according to an embodiment of the present invention, when a person or object carrying the intelligent identification unit passes through such an environment as an office door, a corridor door, a factory building door, an aisle, a stair and the like, the vector pass direction can be judged accurately. Therefore, the identification system has wide application range and strong practicability.

Figure 11:
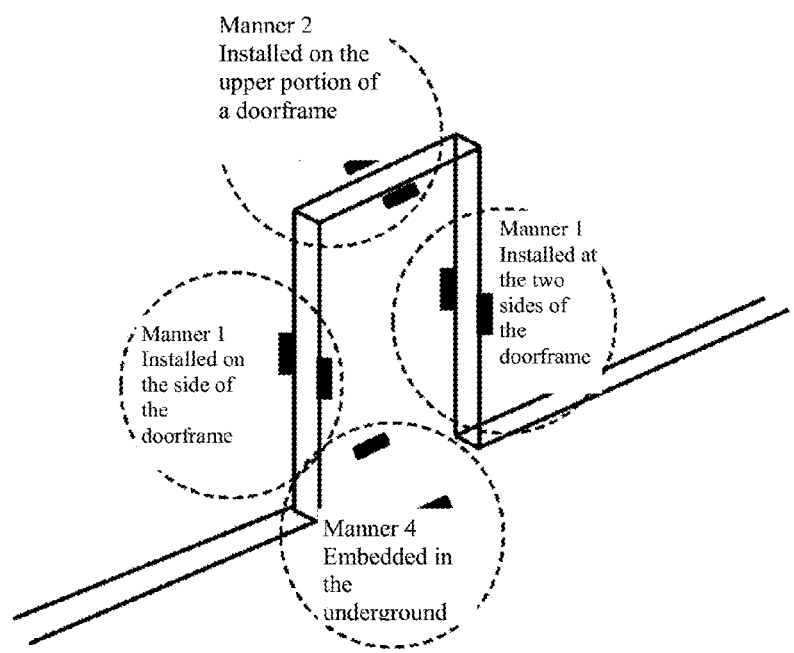
FIG. 11 is an installation schematic view of vector beacons of the identification system for an object's passing route direction according to the present invention.

Wherein, as shown in FIG. 4, FIG. 5 and FIG. 11, the vector beacons can be installed at the single side and both side inside and outside the doorframe according to the width of the door; when the object carrying the intelligent identification unit can pass through the door or return in the mid-way at any angle and position, the system can accurately judge the directions of the vectors that the object finally passes in and out or does not pass in and out.

Moreover, the vector beacons can also be installed at the two sides or single side of a channel according to the width of the channel; when the object carrying the intelligent identification unit can pass through the channel or return in the mid-way at any angle and position, the system can accurately judge the directions of the vectors that the object finally passes in and out or does not pass in and out.

Meanwhile, in a relatively open place, the vector beacons can also be installed on the ground surface, embedded in the underground or suspended above. The identification system has flexible and diverse installation manners, is applicable to various environments, and has wide application range and strong practicability.

The identification system for the object's passing route direction according to one embodiment of the present invention can accurately judge the route direction along which the personnel or object passes through the vector beacons, and the electromagnetic fields of the vector beacons completely cover the region to be tested, which avoids a dead zone and improves the identification efficiency; no manual intervention is needed, and the system automatically interacts information with the intelligent identification unit, which improves intellectualization, has strong applicability and is convenient for a user to inquiry and count; devices of the vector beacons and the intelligent identification unit can be optionally miniaturized, so as to be conveniently installed and look beautiful, thus having a wide application range; diverse installation manners and combination solutions can be realized, and adjusted for matching a signal coverage area, so that the system is applied to doors and channels with various types and sizes, and has strong environmental adaptability; and a combined design of low-frequency beacons and high frequency communications is employed, so that coating and coverage of most substances are not affected; therefore, the identification system improves identification efficiency, and has high communication rate and high channel capacity.

It should be noted that the identification system for object's passing route direction is a system corresponding to the foregoing identification method for object's passing route direction, wherein all the implementation manners in the embodiments of the foregoing method are all applied to the embodiments of the system, and can also achieve the same technical effects.

The invention is not limited by the embodiments described above which are presented as examples only but can be modified in various ways within the scope of protection defined by the appended patent claims.

We claim:

1. A method for identifying an object's passing route direction, wherein the method is applied to a system that comprises at least one group of vector beacons placed at preset intervals, wherein each group comprises two vector beacons, and each group of vector beacons alternatively send two low-frequency signals carrying different attribute codes according to a preset sequence, the two low-frequency signals form two low-frequency electromagnetic fields which are partially overlapped in space, and the preset interval enables the area of the overlapped part of the two low-frequency electromagnetic field to be no less than 70% of the total area of the electromagnetic fields or the maximum extension width of the independence part to be less than 1 m, and the method comprises:

when the object is in a whole process from entering to separating from a region inducted by the low-frequency electromagnetic field, receiving the low-frequency signal of the low-frequency electromagnetic field in real time;

extracting the attribute code and signal intensity corresponding to the low-frequency signal received and conducting associate storage; and after the object separates from the region inducted by the low-frequency electromagnetic field, determining the object's route direction along which the object passes through the vector beacons according to the attribute code and signal intensity stored.

2. The method according to claim 1, wherein the identification method further comprises:

transmitting the route direction along which the object passes through the vector beacons and identification information representing the identity of the object to a superior system.

3. The method according to claim 2, further comprising:

when the step of transmitting the route direction along which the object passes through the vector beacons and the identification information representing the identity of the object to the superior system is failed, retransmitting the route direction and the identification information.

4. The method according to claim 1, wherein the step of determining the route direction along which the object passes through the vector beacons according to the attribute code and signal intensity stored after the object separates from the region inducted by the low-frequency electromagnetic field comprises:

after the object separates from the region inducted by the low-frequency electromagnetic field, sequencing the different attribute codes stored according to a storage sequence, and respectively selecting a preset number of attribute codes as a first segment and a final segment in sequence from the first attribute code and the last attribute code; and respectively comparing signal intensity statistics values of different attribute codes in the first segment and the final segment according to the signal intensity corresponding to the attribute codes, and respectively judging the first approached vector beacon when the object enters the region inducted by the low-frequency electromagnetic field and the last separated vector beacon when the object separates from the region inducted by the low-frequency electromagnetic field according to the comparison result.

5. A system for identifying an object's passing route direction, wherein the system comprises at least one group of vector beacons placed at preset intervals, wherein each group comprises two vector beacons, and each group of vector beacons alternatively send two low-frequency signals carrying different attribute codes according to a preset sequence, the two low-frequency signals form two low-frequency electromagnetic fields which are partially overlapped in space, and the preset interval enables the area of the overlapped part of the two low-frequency electromagnetic field to be no less than 70% of the total area of the electromagnetic fields or the maximum extension width of an independence part to be less than 1 m, and the identification system further comprises:

a receiving module configured to, when the object is in a whole process from entering to separating from a region inducted by the low-frequency electromagnetic field, receive the low-frequency signal of the low-frequency electromagnetic field in real time;

an extraction module configured to extract the attribute code and a signal intensity corresponding to the low-frequency signal received and conduct associate storage; and a judgment module configured to, after the object separates from the region inducted by the low-frequency electromagnetic field, judge the object's route direction along which the object passes through the vector beacons according to the attribute code and signal intensity stored.

6. The system according to claim 5, wherein at the identification system further comprises:

a transmission module configured to transmit the route direction along which the object passes through the vector beacons and identification information representing the identity of the object to a superior system.

7. The system according to claim 6, wherein the identification system further comprises:

a retransmission module configured to, when the step of transmitting the route direction along which the object passes through the vector beacons and the identification information representing the identity of the object to the superior system failed, retransmit the route direction and the identification information.

8. The system according to claim 5, wherein the judgment module comprises:

a selection module configured to, after the object separates from the region inducted by the low-frequency electromagnetic field, sequence the different attribute codes stored according to a storage sequence, and respectively select a preset number of attribute codes as a first segment and a final segment in sequence from the first attribute code and the last attribute code; and a judgment submodule configured to respectively compare signal intensity statistics values of different attribute codes in the first segment and the final segment according to the signal intensity corresponding to the attribute codes, and respectively judge the first approached vector beacon when the object enters the region inducted by the low-frequency electromagnetic field and the last separated vector beacon when the object separates from the region inducted by the low-frequency electromagnetic field according to the comparison result.

* * * * *